United States Patent [19]
Multerer et al.

[11] Patent Number: 6,134,658
[45] Date of Patent: *Oct. 17, 2000

[54] MULTI-SERVER LOCATION-INDEPENDENT AUTHENTICATION CERTIFICATE MANAGEMENT SYSTEM

[75] Inventors: Boyd Multerer; Kerry S. Schwartz, both of Seattle; Kim Stebbens, Redmond, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/871,753

[22] Filed: Jun. 9, 1997

[51] Int. Cl.[7] ................. H04L 9/00; H04L 9/30; H04L 9/32
[52] U.S. Cl. ............... 713/175; 380/255; 380/30; 713/150; 713/155; 713/156; 713/189; 713/200
[58] Field of Search ............... 380/4, 9, 23, 24, 380/25, 29, 30, 49, 50, 59, 21, 255, 287; 713/150, 155–161, 168–182, 189, 200

[56] References Cited

U.S. PATENT DOCUMENTS 5,774,552  6/1998  Grimmer ........................ 380/25
5,787,172  7/1998  Arnold .......................... 380/21
5,864,620  1/1999  Pettitt ............................ 380/4

*Primary Examiner*—Bernarr E. Gregory
*Attorney, Agent, or Firm*—Lee & Hayes, PLLC

[57] ABSTRACT

The multi-server, location-independent authentication certificate management system overcomes the limitations of the existing systems by automating the authentication certificate request, grant and installation processes. Much of the data used to create the authentication certificate request is readily available information, such as: requestor identification, Internet locus, date, time. The authentication certificate management system populates the certificate request with the available data and then prompts the user to provide the additional data in a simple manner, verifying the form and format of the input data. This automation of the authentication certificate request generation minimizes the number of malformed authentication certificate requests. In addition, the authentication certificate management system is capable of being installed on a shared basis, wherein multiple servers and/or multiple services are provided with the authentication certificate from a centralized source. The authentication certificate management system automatically tracks the expiration date of the authentication certificate and also ensures the secure storage of the RSA encryption cryptographic key pair as well as the authentication certificate itself.

38 Claims, 5 Drawing Sheets

MULTI-SERVER LOCATION-INDEPENDENT AUTHENTICATION CERTIFICATE MANAGEMENT SYSTEM

FIELD OF THE INVENTION

This invention relates to the authentication of parties on a data communication system and, in particular, to the use of a third-party authentication certificate authority in Internet client-server applications, which third-party authentication certificate authority functions to issue authentication certificates to servers and, in some cases, clients to validate the identity of the parties who are participating in a data exchange via the Internet.

PROBLEM

It is a problem to authenticate the identity of parties who are participating in a data exchange on a data communication system, such as the Internet. This is typically accomplished by the use of a third-party authenticating authority, which is termed the authentication certificate granting authority. This issue is especially pertinent to the use of Internet, where a plethora of parties have access to the medium and security is rudimentary.

The use of an authentication certificate granting authority in Internet client-server applications relates to the authentication of the identity of the parties who are participating in a data exchange via the Internet. In particular, the authentication certificate granting authority represents an independent third-party entity which functions to issue authentication certificates to servers and, in some cases, clients. The authentication certificates include the use of a private-public RSA encryption key pair and requester distinguishing information to ensure the accurate identification of the requester. The requestor generates the private-public RSA encryption key pair, requestor distinguishing information and transmits this data to the authentication certificate granting authority with a request for an authentication certificate. The authentication certificate granting authority reviews the received data, verifies the identity of the requestor and then transmits the issued (signed) authentication certificate back to the requesting party in encrypted form for installation on the requestor's server. Any client who contacts the requester can access the authentication certificate via the public RSA encryption key and receive an assurance that the party to whom they have connected is indeed the desired party, not a bogus imitator. Likewise, the client can have an authentication certificate capability so that the server can verify the identity of the client for credit/subscription verification.

Unfortunately, the authentication certificate request, issuance and use processes are presently manually executed by the users. As a result, there is a high percentage of errors and mis-installation of authentication certificates on the requestor's server. The authentication certificate process is therefore burdensome, costly and typically mismanaged. The integrity of the authentication certificate process is therefore compromised. In addition, there is presently no capability to manage authentication certificates for multiple server/multiple service installations, where the multiple services are provided and/or the services are provided by a distributed set of servers.

SOLUTION

The multi-server, location-independent authentication certificate management system overcomes the limitations of the existing systems by automating the authentication certificate request, grant and installation processes. Much of the data used to create the authentication certificate request is readily available information, such as: requestor identification, Internet locus, date, time. The authentication certificate management system populates the authentication certificate request with the available data and then prompts the user to provide the additional data in a simple manner, verifying the form and format of the input data. This automation of the authentication certificate request generation minimizes the number of malformed authentication certificate requests. Once the authentication certificate request is completed, it is transmitted to the authentication certificate granting authority for processing.

When the authentication certificate is granted, it is returned to the requesting server and stored therein for use by the requesting party. The authentication certificate management tool is capable of being installed on a shared basis, wherein multiple servers and/or multiple services are provided with the authentication certificate from a centralized source. Thus, receipt of the authentication certificate can be shared among a plurality of users. The authentication certificate management system also automatically tracks the expiration date of the authentication certificate and also ensures the secure storage of the RSA encryption key pair as well as the authentication certificate itself.

The authentication certificate management system therefore automates the certification process, from the generation of the authentication certificate request to the management of the received authentication certificate. This automation enables the user to avoid the difficulties associated with the manual creation of a request and the associated overhead of processing both the request and the authentication certificate receipt.

SUMMARY OF THE INVENTION

The multi-server, location-independent authentication certificate management system K automates the authentication certificate request, grant and installation process by populating the authentication certificate request with available data and then prompting the user to provide the additional data in a simple manner, verifying the form and format of the input data. This automation of the authentication certificate request generation minimizes the number of malformed authentication certificate requests.

DETAILED DESCRIPTION

Figure 1:
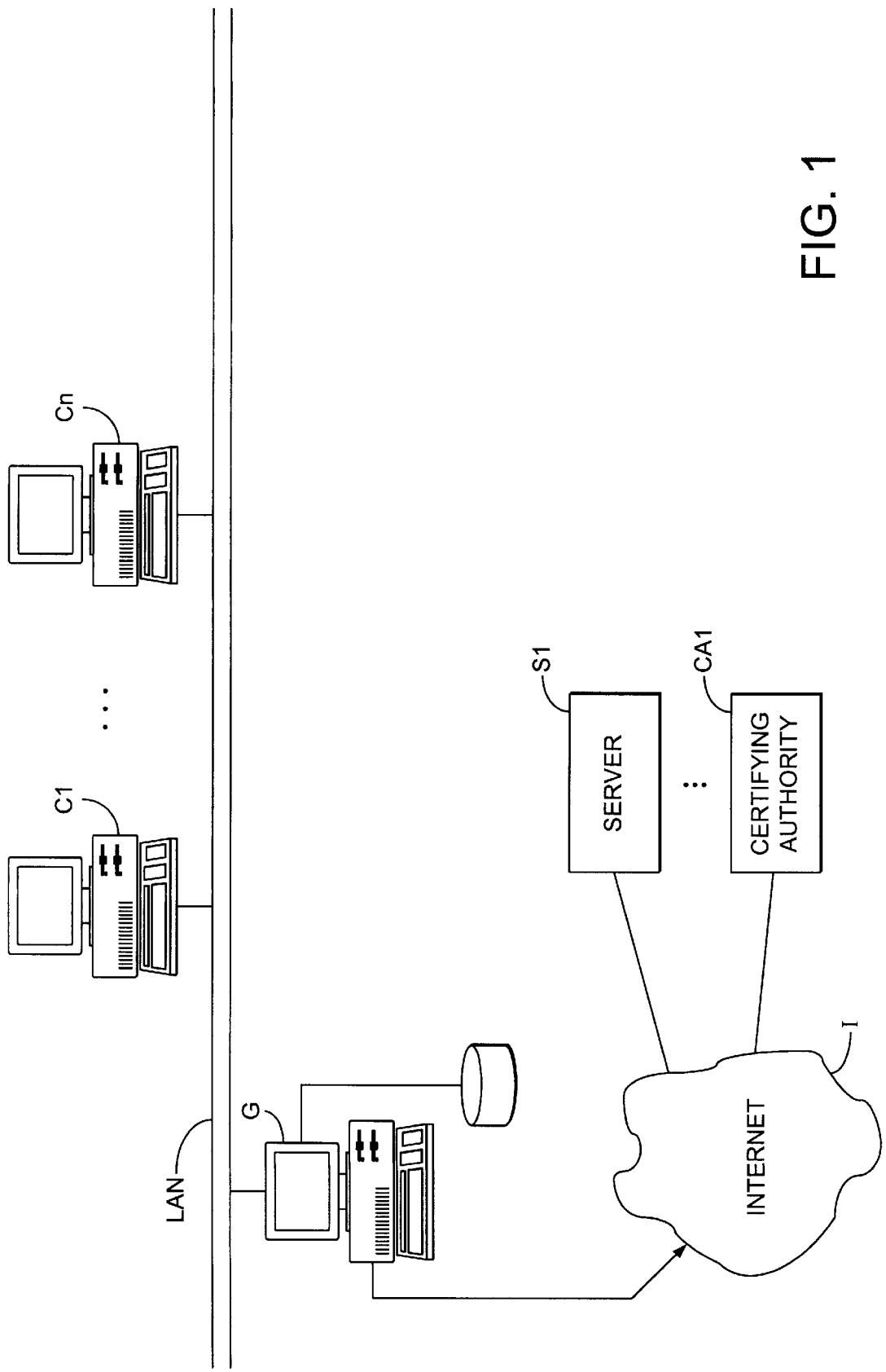
FIG. 1 illustrates in block diagram form the overall architecture of the authentication certificate management system of the present invention and an environment in which it operates.
Figure 3:
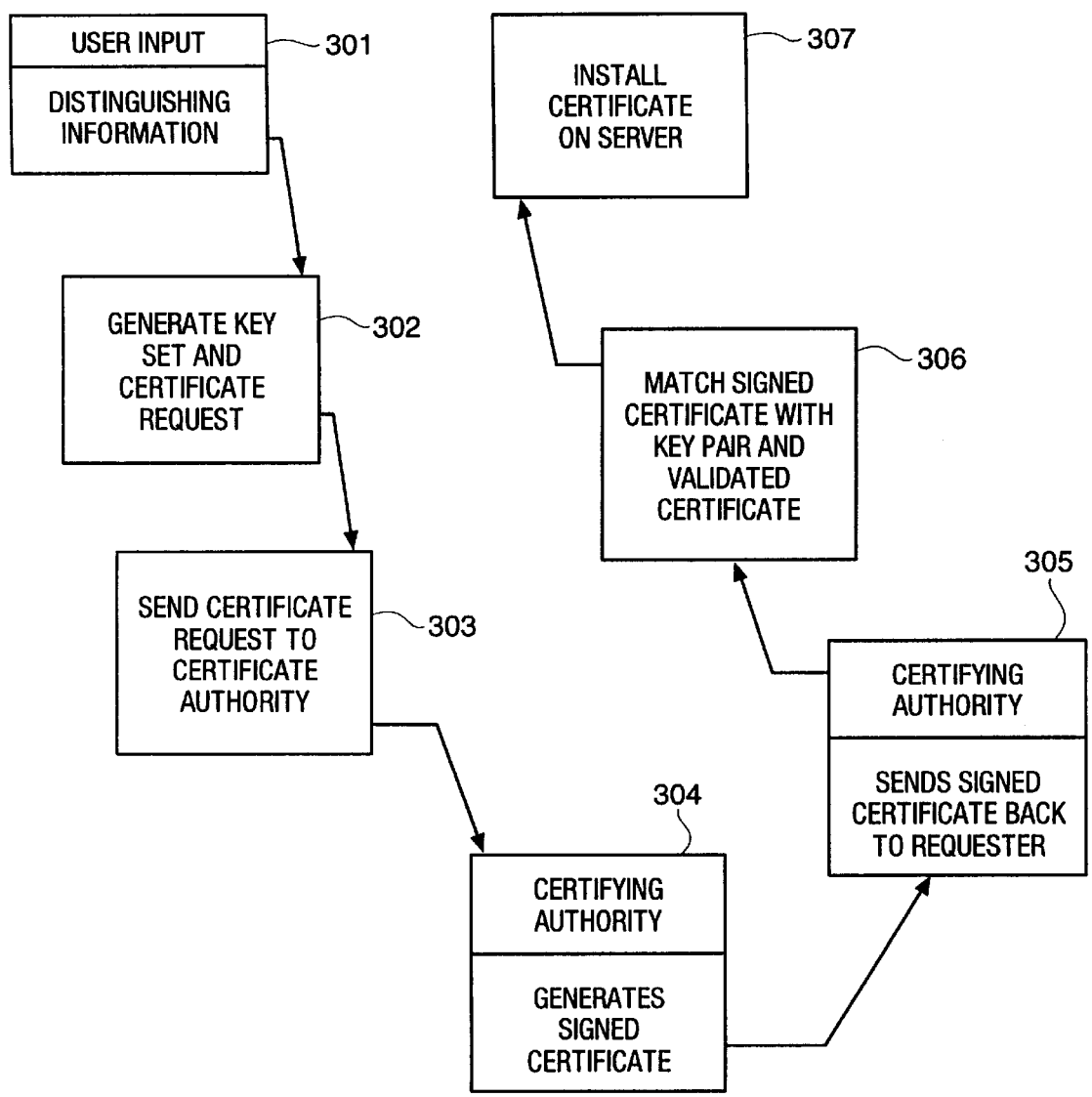
FIG. 3 illustrates in flow diagram form the operational steps taken by the authentication certificate management system of the present invention to generate and deliver an authentication certificate.

FIG. 1 illustrates in block diagram form the overall architecture of the authentication certificate management system of the present invention and an environment in which it operates, while FIG. 3 illustrates in flow diagram form the operational steps taken by the authentication certificate management system of the present invention to generate and deliver an authentication certificate. In particular, data communication networks are in common use today, and a popular publicly available network is the Internet. The Internet functions to interconnect a large plurality of parties via a data communication medium, which is typically the public switched telecommunication network. Each party either individually connects to the Internet via a modem and a dialed up connection, using the existing telecommunication subscriber loop, or via a shared processor which interconnects a plurality of parties to common processing facilities and via a pool of shared modems to the Internet and optionally, other data communication facilities, such as a private intranet. The data communication network illustrated in FIG. 1 is simplified for the purpose of this description and comprises a data communication medium, such as Internet, which interconnects a first party herein termed "server S1", with third-party authentication certificate granting authority CA1. In addition, a gateway system G functions to interconnect the Internet with a plurality of local processors, C1–Cn via a local area network LAN, with the local processors including a second party herein termed "client C1", which itself can serve a plurality of subscribers, The server S1 can implement a plurality of services, each of which is capable of being operationally independent of the other services extant on server S1. Alternatively, the services extant on server S1 can be a collection of interrelated services. In any case, the server S1 provides one or more services to the clients C1 who interconnect with server S1.

The difficulty with a client C1 using the Internet to interconnect with server S1 and exchanging data therebetween and possibly engaging in financial transactions, is that there is no way of verifying the identity of the server S1 to whom the client C1 is connected. To obviate this problem, there are presently authentication certificate granting authorities CA1 who function to validate the identity of servers S1 who are connected to the Internet. The use of an authentication certificate granting authority CA1 in Internet client-server applications relates to the authentication of the identity of the parties who are participating in a data exchange via the Internet. In particular, the authentication certificate granting authority CA1 represents an independent third-party entity connected to the Internet and which functions to issue authentication certificates to servers S1 and, in some cases, clients C1. The authentication certificates include the use of a private-public RSA encryption key pair and requestor (either client or server) distinguishing information to ensure the accurate identification of the requester.

Authentication Certificates

The authentication certificate request and granted authentication certificate are both maintained in ASCII form. The request is architected in a predefined format and includes the requestor's name, telephone number and E-Mail address. In addition, the requestor's company name, organizational unit, locality, state or province in which the company is located, and common name or acronym for the company is included in the request. The form of the request requires the exact population of the fields with this data in ASCII form to result in a completed request, an example of which is:

```
MIIBQDCB6wIBADCBhTELMAkGA1UEBhMCVVMxCzAJBgNVBA
gTA1dBMRAwDgYDVQQHEwdSZWRtb25kMRcwFQYDVQQKEw
5NaWNyb3NvZnQgQ29ycDEiMCAGA1UECxMZSW50ZW51dCBJ
bmZvcm1hdG1vbiBTZXZ1cjEaMBgGA1UEAxQRSU1TLk1pY3Jvc
29mdC5jb20wXDANBgkqhkiG9w0BAQEFAANLADBIAkEA1/7TEC
8UG/dgYiMIuSMffh8rWsWdoeeV4HU541HHogw8gKio9Ar/UC8aD
YNxBVq5vuVFqzZJO1Ew1Cd8s/7/QQIDAQABoAAwDQYJKoZIhv
cNAQEEBQADQQCGs3MQAMztP7gkj2OvuKSCDGxoWmTcR9vb
1j2X1p9rEKje64sl4mCYtP/uGUF5594LEzycrh1D4PWWF9WcPRH9
```

Thus, the most minor of errors in the data input results is an authentication certificate request that is rejected by the certificate granting authority. The certificate granting authority generates a signed authentication certificate, which is also of form, format and content similar to that of the authentication certificate request, and must be processed in a manner to comply with the defined format.

Authentication Certificate Management System

Figure 2:
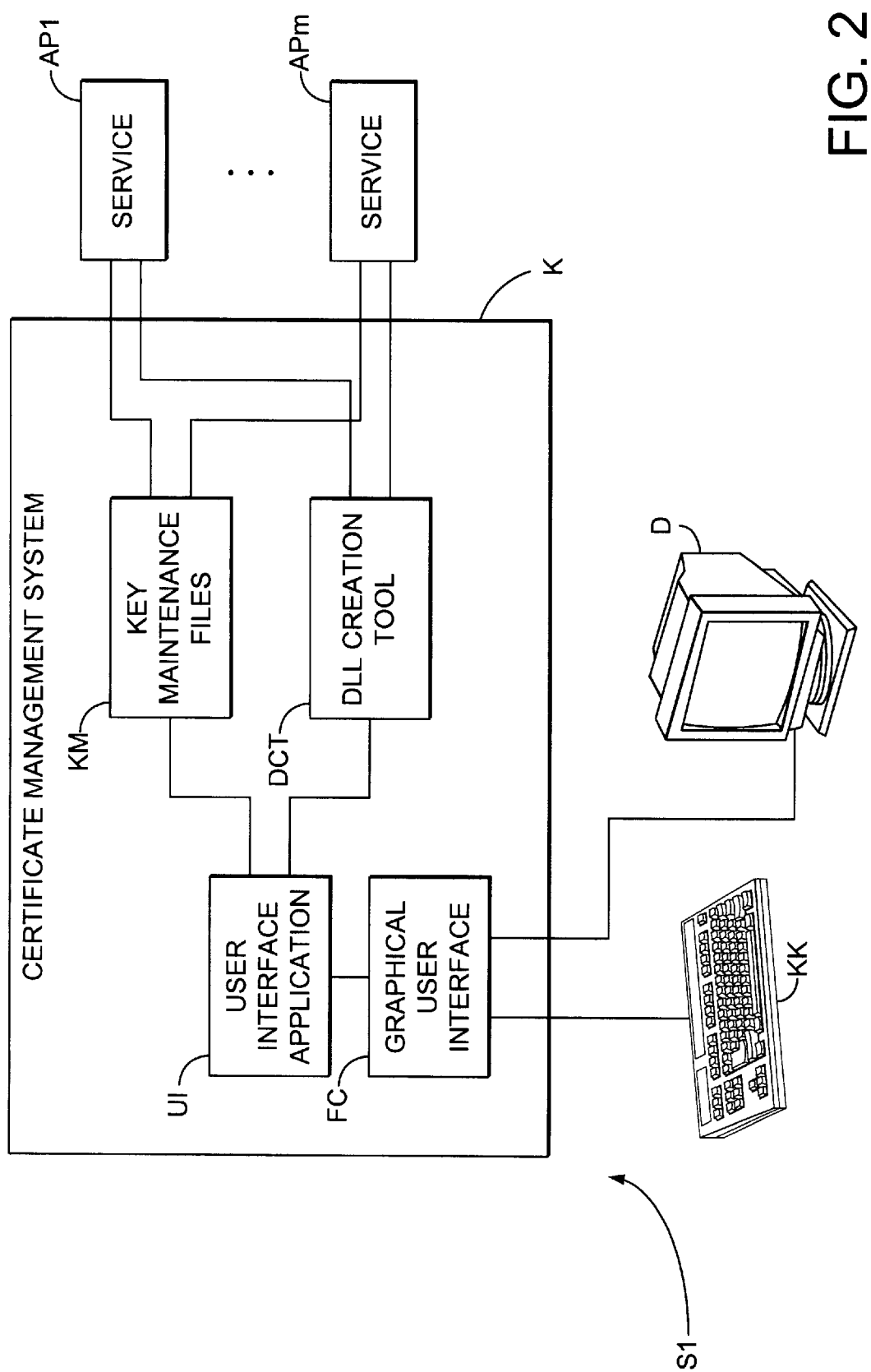
FIG. 2 illustrates additional details of the authentication certificate management system of the present invention.
Figure 4:
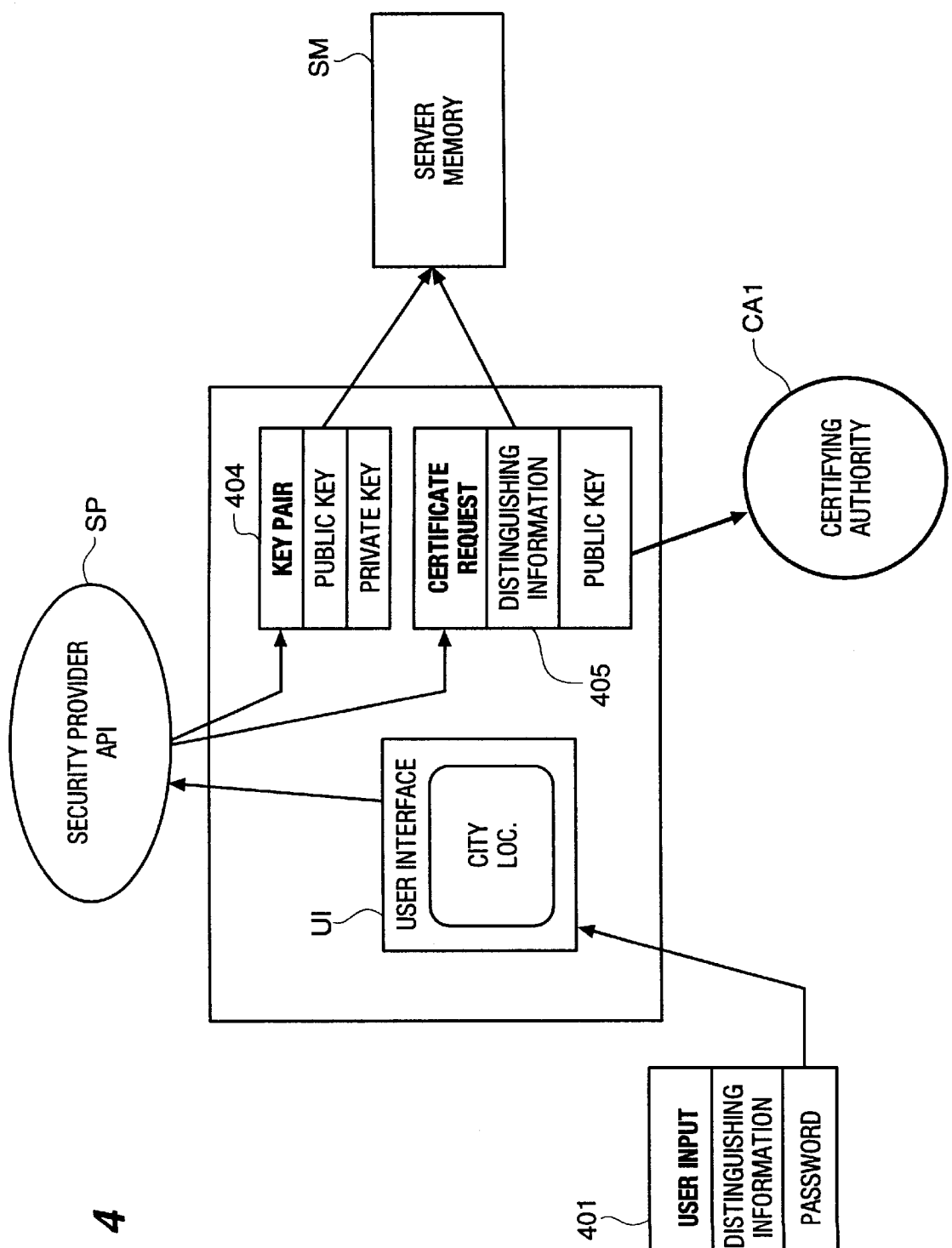
FIG. 4 illustrates in block diagram form the flow of information among the various elements which comprise the authentication certificate management system of the present invention and an environment in which it operates for the authentication certificate request generation process.
Figure 5:
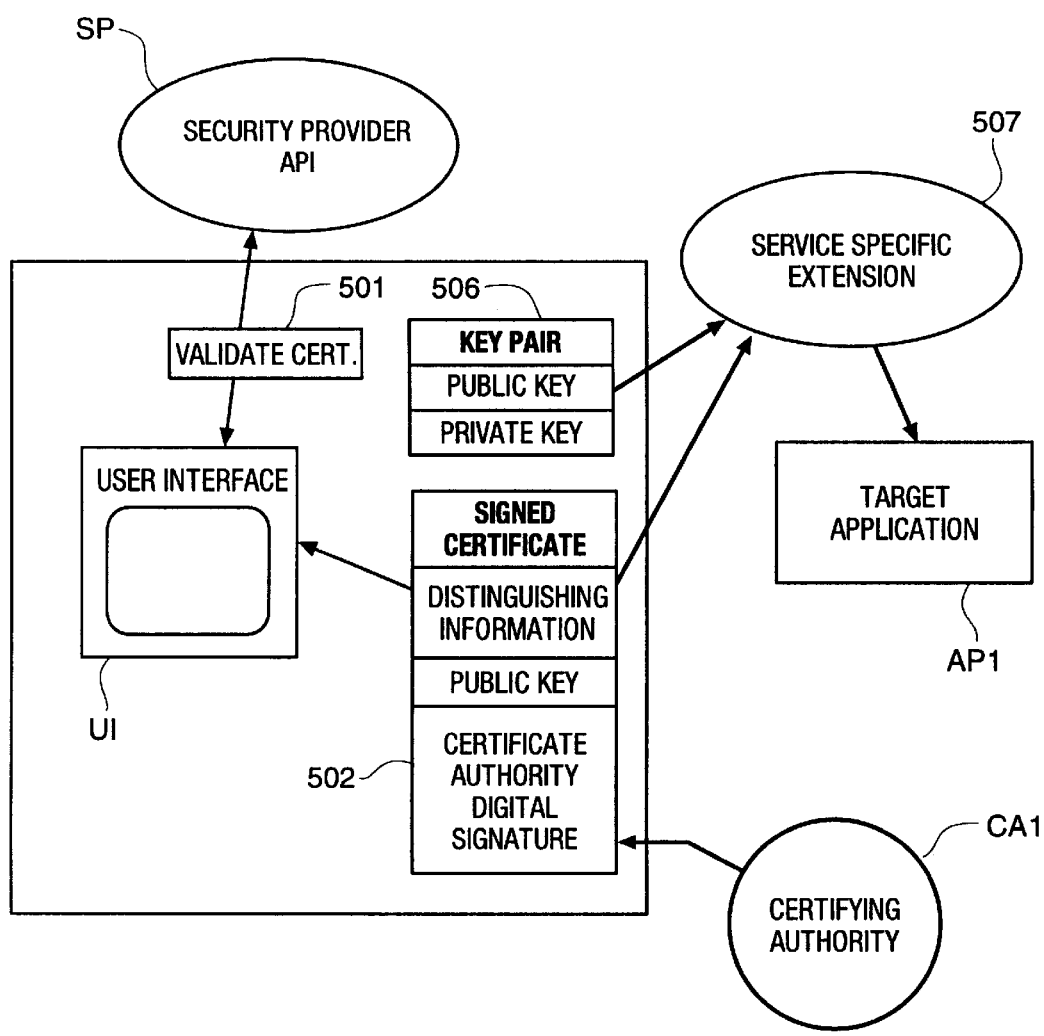
FIG. 5 illustrates in block diagram form the flow of information among the various elements which comprise the authentication certificate management system of the present invention and an environment in which it operates for the process which installs the signed authentication certificate.

FIG. 2 illustrates the architecture of the authentication certificate management system K of the present invention which is installed on the server S1 to accomplish the automatic generation of authentication certificate requests and the management of the signed authentication certificates received from the authentication certificate granting authority CA1. FIGS. 4 and 5 illustrate, in block diagram form, the flow of information among the various elements which comprise the authentication certificate management system K for the authentication certificate request generation process and for the process which installs the signed authentication certificate on the target applications of the server S1, respectively.

The authentication certificate management system K comprises a plurality of elements which are cooperatively operative to maintain and organize cryptographic keys which are used to secure Internet communications. The authentication certificate management system K includes applications for organizing the cryptographic keys and also provides cryptographic key maintenance facilities KM, such as requesting and updating cryptographic keys and cracking basic information from the cryptographic keys. The authentication certificate management system K is implemented in the form of a user interface application UI, which includes a graphical user interface FC which drives the display D and receives data from the user input devices KK, in well known fashion. The authentication certificate management system K also includes a DLL creation tool DCT which enables the user to create the DLLs required to provide the desired authentication certificate feature. The user typically creates a plurality of DLLs using the DLL creation tool DCT, with each DLL corresponding to the protocol required for a particular service AP1 resident on server S1. The various services AP1–APm that provide secure channel communications require that the cryptographic keys be stored and accessed in different ways. The various DLLs are therefore responsible for storing the cryptographic keys for these services in such a way that the associated service can use the cryptographic key. In addition, the DLLs notify the services of changes, retrieve the cryptographic keys for the authentication certificate management system K and provide any service specific functionality that is required. The authentication certificate management system K is a Microsoft File Creation application and the DLLs created by the authentication certificate management system K are Microsoft File Creation DLLs. When looking at the user interface UI, what is of concern is the contents of the left Tree pane of the directory tree when the user interface UI displays the directory and file structure of the server S1. This directory tree represents a system of networked machines, each containing the target services AP1–APm that are supported by the authentication certificate management system K. These target services AP1–APm each have cryptographic keys associated with and stored within them as part of the authentication certificate management process. The authentication certificate management system K maintains the file objects that represent the networked machines on which the target services AP1–APm reside. The header file "KeyObjs.h" located in the authentication certificate management system K, describes the file objects that are relevant to the external DLLs. The user generated DLLs must override both the target service class and the cryptographic key class. To accomplish this, each DLL maintains one service level object and the cryptographic keys that it contains. The user can retrieve the properties of either the target services AP1–APm or the cryptographic keys, and the DLL created by the user for the target service AP1–APm has an opportunity to provide specific configuration functionality at these times.

Class Structure

The interface for the authentication certificate management system K extensions consists of an application which defines a plurality of classes that the user must override to provide the specific functionality. The base class for all objects that can be in the tree view is the CTreeItem class. The objects included in this group are machines, target services, cryptographic keys and cryptographic key folders. In this structure, each tree item objects can contain other tree item objects. Thus, the user can add services to machines and cryptographic keys to services.

The CTreeItem class is defined in the authentication certificate management system K, and its purpose is to provide a base set of functionality for managing the object items in the tree. For example: given any CTreeItem derived object (that has been added to the tree), tree children can be added to this object, these tree children can be searched, parent object of this object can be retrieved, the name and icon of this object can be set, and the like. All these routines are described in the CTreeItem section of the header file.

All the sub-classes of the CTreeItem class have the option of allowing customizable properties through the OnUpdateProperties and OnProperties methods. If the user overrides these methods and treats them like a normal Microsoft File Creation command handler, the Properties item in the context menu is available and the user has the ability to process the Properties item as is well known.

Service Objects

The first thing the DLL generated by the user in the DLL creation tool DCT must do is create a service object and attach it to a machine. This service object is represented as the mid-level item in the directory tree. The service object must be a sub-class of the provided CService class, which is defined in the KeyObjs.h file. The main purpose of the service object is to provide the basic interface to the specific service on the target machine. The target machine can be a WWW server, pop3, nmtp and the like. When the authentication certificate management system K first attempts to establish contact with the target machine, it creates a CMachine object which targets that machine and asks all the extension DLLs to attach service objects to it. The authentication certificate management system K accomplishes this by calling the exported Load Service routine in the DLL and passing it the machine. This is the only explicitly exported routine that must be supported. The remainder of the process is achieved by the use of virtual tables.

If the selected service can be targeted to the designated machine, the user creates a CService object and adds this to the target machine by using the FAddToTree operation. At this time, the custom icons and the like can be installed on the target machine. The authentication certificate management system K must also override the PNewKey method in the user's service class. The cryptographic key class is also overridden. After adding the selected service object to the designated target machine, and returning from the LoadService routine, the user's service LoadKeys method is called. The parental CMachine is passed to this method if not previously loaded. The LoadKeys method enables the user to define the methodology used to access the designated service. This is accomplished by creating the necessary cryptographic keys and using the CKey process created objects by attaching them to the service object.

Once the user changes the cryptographic keys, the FCommitChangesNow method is called to write all of the cryptographic keys out to the designated service on the target machine. When the authentication certificate management system K disconnects from a target machine, it calls the CloseConnection method of all of the services attached to that machine object.

Cryptographic Key and CMachine Objects

The cryptographic key objects are the primary place that the sensitive cryptographic key information is stored. As the service object loads the stored cryptographic keys, the service object creates a plurality of cryptographic key objects and attaches these cryptographic key objects to the service object. The cryptographic key object is used to provide access to the public cryptographic key information and to maintain the cryptographic key's data. The cryptographic key object contains four pieces of information that must be securely stored and retrieved for each cryptographic key. This information comprises: private cryptographic key, public cryptographic key, certificate request data, and password. The authentication certificate management system K provided the user with the capability to copy/cut/paste cryptographic keys within and between services.

CMachine objects are created, held and maintained exclusively within the authentication certificate management system K. They are the parents of the service objects and are available for the user to obtain information regarding the target machine.

CKeyCrackedData Objects

CKeyCrackedData Objects is a utility object provided to give easy access to the contents of a cryptographic key's public certificate. The user creates an instance of CKeyCrackedData and calls CrackKey to pass the cryptographic key of interest.

System Operation

In operation, as shown in flow diagram form in FIG. 3 and in block diagram form in FIGS. 4 and 5, the requester, a user at server S1 in this example, initiates the authentication certificate request generation process at step 301 by selecting the certificate generation process for activation and inputing a predetermined set of requestor distinguishing information and a password 401 to the user interface UI. The user interface UI verifies the format of the requestor distinguishing information and forwards this received information to the security provider SP application resident on server S1. At step 302, the security provider application SP of the server S1 generates the private-public RSA encryption cryptographic key pair 404, and the authentication certificate request 405 which includes the user distinguishing information and the public cryptographic key. Both the private-public RSA encryption cryptographic key pair 404, and the authentication certificate request 405 are stored in the memory SM of the server S1 for future reference. At step 303, the server S1 transmits the authentication certificate request 405 to the authentication certificate granting authority CA1 in the form of a request for an authentication certificate.

The authentication certificate granting authority CA1 receives the transmitted data at step 304, reviews the received data, verifies the identity of the requestor. If the received data matches the requester validating information that is available to the authentication certificate granting authority CA1, the authentication certificate authority CA1 generates the signed authentication certificate. At step 305, the authentication certificate granting authority CA1 transmits the issued authentication certificate 502 back to the requesting party, server S1, in encrypted form for installation on the requestor's processor.

This process is accomplished by the server S1 as shown in steps 306–307 of FIG. 3 and in block diagram form in FIG. 5. At step 306, the signed authentication certificate 502, received from the authentication certificate granting authority CA1 is available for installation on one or more application processes AP1–APm on one or more target machines, such as server S1. This is accomplished by the user accessing the user interface UI and activating the install certificate option. The user is prompted by the user interface UI for the location of the signed authentication certificate 502 as well as the password for unlocking the cryptographic key pair. The user interface UI uses this information to activate the validate certificate process which interfaces with the security provider application SP. The validation occurs in the security provider application SP which matches the signed authentication certificate 502 with the private-public RSA encryption cryptographic key pair 506 and the validated authentication certificate request 405. At step 307, the server S1 stores the signed authentication certificate in memory for future access by clients by calling the service specific extension 507 which receives the cryptographic key pair 506 and the signed authentication certificate 502, and loads the signed authentication certificate on the target system S1. This is accomplished by the authentication certificate management system K querying the service specific extension 507 for the identity of the server S1 that it has previously connected to for an enumeration of the signed certificates that the service specific extension 507 maintains on the specified server S1. The authentication certificate management system K checks the expiration date of the signed authentication certificate 502 and if the date is within a predetermined time range or has expired, the authentication certificate management system K displays a graphical warning to the user about pending or actual expiration of the signed authentication certificate 502. The signed authentication certificate 502 can be moved and/or copied by use of the graphical interface on the user interface UI via the cut, copy and paste operations active thereon. Any client C1 who contacts the requester, server S1, can access the signed authentication certificate 502 via the public RSA encryption cryptographic key and receive an assurance that the party to whom they have connected is indeed the desired party, not a bogus imitator. Likewise, the client can have an authentication certificate capability so that the server S1 can verify the identity of the client for credit/subscription verification.

Typical Implementation Of A C++ User Interface

The following represents a C++ implementation of a typical DLL creation tool DCT in the user interface UI. This example illustrates the various elements which comprise the DLL creation tool DCT.

```
//protect this file against multiple inclusion
#ifndef KEYRINGOBJECTS
#define -KEYRINGOBJECTS-
/* STARTING
```

When creating your dll using this api, you will be mostly concerned the CService and CKey object classes. You are expected to override both of these and provide functionality for storing/retrieving the cryptographic keys and maintaining any service specific properties. Your dll needs only one exported routine "LoadService" defined below. This routine creates your overridden service object, populates it with retrieve cryptographic keys, and connects it to its host machine. The Machine object is passed in to this routine and the service is returned. If the host machine does not have your service on it, simply return from LoadService without attaching a service object to it.

PROPERTIES

You can enable the properties item in the context menu for either your cryptographic keys or your service by overriding the classes' OnUpdateProperties and OnProperties routines. These are very similar to MFC command handlers. In fact, they are just passed in from a command handler. You can do whatever you feel like in the OnProperties routine, although some sort of dialog is probably appropriate;

INFO STRING

Services and Cryptographic Keys also have the option of displaying a one-line information string in the right-hand pand of the cryptographic keyring application. To do this, override the GetInfoString method and return something.

Cryptographic key NAMES

All cryptographic keys have names and you are expected to store/retrieve them. The name is automatically editable in the right-hand pane of the main app. The name, however, can be different from the caption in the tree view. To do this, override the UpdateCaption routine and use it to call FSetCaption with a modified string name. An example can be seen in the W3 server, which displays the name of the cryptographic key followed by the ip address it is attached to in brackets. MyKey<100.200.150.250>

CUSTOM ICONS IN TREEVIEW

You can add your own custom icons to the tree view in addition to the standard machine, cryptographic key, unfinished cryptographic key icons. To do this, get the CTreeCtrl object by calling PGetTreeCtrl. Then use that to get the CImageList. From there, you can add your own icons (making sure to note down the starting index) See CTreeCtrl and CImageList docs for details.

```
*/
//basic icon numbers
enum
{
    TREE_ICON_MACHINE = 0,
    TREE_ICON_KEY_OK,
```

-continued

```
    TREE_ICON_KEY_IMMATURE,
    TREE_ICON_KEY_EXPIRED
    };
//declare the correct dllexport definitions
#ifdef _EXE_
    // we are exporting the classes - this is the main application
    #define DLL_SHARE     _declspec( dllexport )
#else
    // we are importing the classes  - this is your dll
    #define DLL_SHARE     _declspec( dllimport )
#endif _EXE_
//=======================Forward class declarations
class DLL_SHARE Cmachine;
//=======================Template for the exported routine
extern BOOL _cdecl LoadService( Cmachine* pmachine);
//---------------------------------------------------------
// CTreeItem
// This is the base class for all objects that can be in the tree view.
// This includes machines, services, cryptographic keys and cryptographic key
folders. Note that each
// tree item object can contain other tree item objects. This interface
// allows you to access the item's handle in the tree.
class DLL_SHARE CTreeItem : Public CObject
    {
    public:
        // constructors
        CTreeItem( );
        // get the parent object
        CTreeItem* PGetParent( void);
        // remove this item from the tree
        BOOL FRemoveFromTree( );
        // access the name of the item
        // Must be added to parent first!
        virtual void UpdateCaption(void) {;}
        BOOL FSetCaption (CString & szName)
        // a informational string that is displayed in the right-hand
        //pane of the main application. Override to actually show something
        virtual void GetInfoString (CString & szInfo)
            { szInfo.Empty( ); }
        // access the image shown in the tree view
        // Must be added to parent first!
        WORD IGetImage(void) { return m_image;}
        BOOL FSetImage(WORD i);
        // get the grandparental ctreectrl object
        CTreeCtrl* PGetTreeCtrl( void );
        // add the item to the tree
        BOOL FAddToTree( CTreeItem* pParent )
        // how many children does this item have?
        WORD GetChildCount( );
        // get the HTREEITEM handle
        HTREEITEM HGetTreeITem( ) { return m_hTreeItem; }
        //do you want the properties item in the context menu?
        //the default is NO - Override these in your subclasses
        //to provide specific properties dialogs
          virtual void OnUpdateProperties(CCmdUI* pCmdUI)
              {pCmdUI—>Enable(FALSE);)
        //your properties item has been selected
          virtual void OnProperties( ) (ASSERT(FALSE);)
        // helpful utilities for scanning the
        // children contained by a object
          CTreeItem*GetFirstChild( );
          CTreeItem*GetNextChild( CTreeItem* pKid );
        //access to the dirty flag
        //setting dirty affects parents too (in the default method)
        virtual void SetDirty(BOOL fDirty);
        virtual BOOL FGetDirty( )
            { return m_fDirty; }
    protected
        // DO declare all this stuff DYNCREATE
        DECLARE-DYNCREATE(CTreeItem);
        // the name of the item. In the case of cryptographic keys, you should
        // store this name and retrieve it later
        CString m_szItemName;
        // index of the item's image in the image list
        // Note: if you wish to have a special icon different from
        // the standard icons enumerated above, (e.g. for a service)
        // you get the tree control, then use that to get its CImageList
        // object. Then you call the Add member of the image list.
        // That call does return the index of your first added image.
```

```
            WORD             m_iImage;
            // the dirty flag
            BOOLm_fDirty;
      private:
        // the item's reference handle in the tree
        / access it using the api above
        HTREEITEM m_hTreeItem;
        };
//------------------------------------------------------------
// CKey
// This class is what its all about. This is a cryptograpic key. You should override
// this class. You are expected to provide storage and retrieval of this
// cryptographic key. You are also expected to provide any properties dialogs and
such.
// basic SSL functionality has already been built in.
class DLL_SHARE CKey :public CTreeItem
        {
        public:
            CKey( );
            ~CKey( );
        // override the update caption so the name is automatically shown
                {
                FGSetCaption(m_szItemName);
                UpdateIcon( );
                }
        // update the currently shown icon
        virtual void UpdateIcon( void );
        // the private cryptographic key-keep this safe! // must store!
        DWORD       m_cbPrivateKey;
        PVOID       m_pPrivate Key;
        // the certificate    // must store!
        DWORD       m-cbCertificate;
        PVOID       m_pCertificate;
        // the certificate     request//must store!
        DWORD       m_cbCertificateRequest;
        PVOID       m_pCertificateRequest;
        // the password.   Be careful where you
        // store this.
        CString     m_szPassword;
        // make a copy of the cryptographic key
          virtual CKey* PClone(void);
        // checks that the cryptographic key, certificate and password all match
           BOOL FVerifyValidPassword( CString szPassword );
        // routine for installing the certificate
        virtual BOOL FInstallCertificate( CString szPath, CString szPass );
        virtual BOOL FInstallCertificate(PVOID pCert, DWORD cbCert, CString &szPass
        };
        // write out the request file
        virtual BOOL FOutputRequestFile( Cstring szFile, BOOL fMime = FALSE,
PVOID privdata = NULL );
        // copy the members from a cryptographic key into this key
        virtual void CopyDataFrom( CCryptographic key* pCryptographic key );
        // called by the right-hand dialog pane
        virtual void SetName( CString &szNewName );
        virtual CString GetName( )
                { return m_szItemName; }
        // import/export routines
        virtual BOOL FImportKeySetFiles( CString szPrivate, CString szPublic,
CString &szPass
        BOOL FImportExportBackupFile( CString szFile, BOOL fImport ):
        protected:
        // DO declare all this stuff DYNCREATE
        DECLARE_DYNCREATE(CKey);
        private:
        void OutputHeader(CFile* pFile, PVOID privData1, PVOID privData2);
        };
//------------------------------------------------------------
// CService
// This class MUST be overridden in your dll! It is your main to the app.
// It resides on a machine and contains cryptographic keys
class DLL_SHARE CService: public CTreeItem
        {
        public:
        // create a new cryptographic key. You can override to
        //create a cryptographic key of your own class type
        virtual CKey* PNewCryptographic key( ) {return new CKey;}
        load the existing cryptographic keys
        virtual void LoadKeys( CMachine* pMachine ) {;}
        / the order in which things happen is that you are responsible
```

-continued

```
        // for creating this service object and populating it with cryptographic key
        / objects that you retrieve from whatever storage medium you want
        Then, if that is successful, you attach this service
        // to the machine that is passed in to you through the LoadService
        // routine. - NOTE that routine is a direct export of your DLL;
        // see the definition of that routine above.
        // CommitChanges is where you write out any and all changes in
        // the service's cryptographic key list to some storage facility. The storage
        // facility and the manner in which you access it is up to you.
        virtual BOOL FCommitChangesNow( ) (return FALSE;)
        // CloseConnection is called before disconnecting a machine from
        / the tree, or when application is exiting.
        virtual void CloseConnection( );
        protected:
        // DO declare all this stuff DYNCREATE
        DECLARE-DYNCREATE(CService);
        private:
        };
//-----------------------------------------------------------
// CKeyCrackedData
//This is a special purpose class. You give it a cryptographic key object (must have
a
//valid certificate attached to it) and it will crack the certificate.
//you can then use the supplied methods to access the data in the certificate
// This uses a two-step construction. First, declare the object, then
// crack it using the CrackKey command, which returns an error code
class DLL_SHARE CKeyCrackedData : public CObject
        {
        public:
        // constructor
        CKeyCrackedData( );
        ~CKeyCrackedData( );
        // give it a cryptographic key to crack. If this object was previously used to
        /crack a cryptographic key, cleanup is automatically done and the new
cryptographic key is
        //cracked - NOTE: The target cryptographic key MUST have either a
certificate
        //or a certificate request Those are what get cracked. A return
        /value of 0 indicates success
        WORD CrackKey( CKey* pKey);
        // The rest of the methods access the data in the cracked certificate
        DWORD       GetVersion( );
        DWORD*      PGetSerialNumber( );
        // returns a pointer to a DWORD[4]
        int     GetSignatureAlgorithm( );
        FILETIME        GetValidFrom( );
        FILETIME        GetValidUntil( );
        PVOID           PSafePublicKey( );
        DWORD       GetBitLength( );
        void    GetIssuer( Cstring &sz );
        void    GetSubject( CString &sz );
        void    GetDNCountry( CString &sz );
        void    GetDNState( CString &sz );
        void    GetDNLocality( CString &sz );
        void    GetDNNetAddress( CString &sz );
        void    GetDNOrganization( CString &sz );
        void    GetDNUnit(CString & sz);
        protected:
        private:
        void            GetDN(CString &szDN, LPCSTR szKey);
                        CKey* m-pKey;
                        PVOID m_pData;
        };
// CMachine
// This class is almost always used just by the application. It is the
// machine that the services and cryptographic keys reside on. It is very simple and
//I is to be used just to attach the services to something. Otherwise it
// maintains where the machine is.
class DLL_SHARE CMachine: public CTreeItem
        {
        public:
        //the machine objects are always created and maintained by the
        //application. This interface is provided just so that you can
        // attach and detach services to it.
        //query this method to see if this is the local machine or
        //a remote machine on the net.
        virtual BOOL FLocal( );
        // NOTE: when you add the service to the machine it is also added
        // to the tree view. The machine is always added to the tree view
```

-continued

```
    //before you are asked to load your service. Immediately after
    //adding your service to the machine, don't forget to set the
    //service's caption string.
    virtual void GetMachineName(CString& sz);
    protected:
    //DO declare all this stuff DYNCREATE
    DECLARE_DYNCREATE(CMachine);
    // The name of the machine. - This MAY be different from the caption
    // in the tree view. This is the name you use to link to the machine
    // over the net. In the case of the local machine, this string will
    // be empty. Use SZGetMachineName( ) above to access it.
    CString       m_szNetMachineName;
    private:
    }
// end inclusion protection
#endif //__KEYRINGOBJECTS__
```

We claim:

1. An authentication certificate management apparatus comprising:

means, responsive to a user initiating a request for issuance of an authentication certificate, for automatically generating an authentication certificate request, which has a predetermined format and content including a plurality of fields of data, wherein the means for automatically generating an authentication certificate request includes:

means for prompting said user to input at least one set of data for entry into at least one of said plurality of fields of data, means for verifying form and format of said user input data, means for automatically generating at least one set of data, means for processing said automatically generated at least one set of data and said user input data into said predetermined authentication certificate request format and content; and means for transmitting said generated authentication certificate request to an authentication certificate granting authority.

2. The apparatus of claim 1 wherein said means for automatically generating at least one set of data comprises:

means for automatically generating a private-public encryption cryptographic key pair.

3. The apparatus of claim 2 wherein said means for processing comprises:

means for incorporating a public encryption cryptographic key of said private-public encryption cryptographic key pair into said authentication certificate request; and means for storing said generated private-public encryption cryptographic key pair in said server.

4. The apparatus of claim 3 wherein said means for processing further comprises:

means for storing said generated authentication certificate request in said server.

5. The apparatus of claim 4 further comprising:

means, responsive to receipt of a signed authentication certificate from an authentication certificate granting authority, for installing said signed authentication certificate on a server for at least one target machine.

6. The apparatus of claim 5 wherein said means for installing comprises:

means, responsive to a user inputting a password, for unlocking said private-public encryption cryptographic key pair;

means for matching said signed authentication certificate with said private-public encryption cryptographic key pair and said stored authentication certificate request to validate said signed authentication certificate; and means, responsive to a validated signed authentication certificate, for storing said validated signed authentication certificate in said server for said at least one target machine.

7. The apparatus of claim 6 further comprising:

means, responsive to receipt of a request from a user located external to said server for a signed authentication certificate from said target machine, for utilizing a public encryption cryptographic key received from said user to access said stored private-public encryption cryptographic key pair stored in said server to validate said request; and means, responsive to validation of said user provided public encryption cryptographic keys, for transmitting said stored signed authentication certificate to said user.

8. The apparatus of claim 7 further comprising:

means, responsive to receipt of a request from a user for a signed authentication certificate, for checking the expiration date of the signed authentication certificate stored in said server to ascertain its validity; and means, responsive to said means for checking, for generating an alert about pending or actual expiration of the signed authentication certificate where said expiration date is within a predetermined time range of expiration or has expired.

9. A method of providing network services to at least one application process on at least one target machine, the method comprising:

automatically generating, in response to a user initiating a request for issuance of an authentication certificate, an authentication certificate request, which has a predetermined format and content including a plurality of fields of data, wherein the step of automatically generating an authentication certificate request includes:

prompting said user to input at least one set of data for entry into at least one of said plurality of fields of data, verifying form and format of said user input data, automatically generating at least one set of data, processing said automatically generated at least one set of data and said user input data into said predetermined authentication certificate request format and content; and transmitting said generated authentication certificate request to an authentication certificate granting authority.

10. The method of claim 9 wherein said step of automatically generating at least one set of data comprises:
   automatically generating a private-public encryption cryptographic key pair.

11. The method of claim 10 wherein said step of processing comprises:
   incorporating a public encryption cryptographic key of said private-public encryption cryptographic key pair into said authentication certificate request; and
   storing said generated private-public encryption cryptographic key pair in a server.

12. The method of claim 11 wherein said step of processing further comprises:
   storing said generated authentication certificate request in said server.

13. The method of claim 12 further comprising the step of:
   installing, in response to receipt of a signed authentication certificate from an authentication certificate granting authority, said signed authentication certificate on said server for said at least one target machine.

14. The method of claim 13 wherein said step of installing comprises:
   unlocking, in response to a user inputting a password, said private-public encryption cryptographic key pair;
   matching said signed authentication certificate with said private-public encryption cryptographic key pair and said stored authentication certificate request to validate said signed authentication certificate; and
   storing, in response to a validated signed authentication certificate, said validated signed authentication certificate in said server for said at least one target machine.

15. The method of claim 14 further comprising:
   utilizing, in response to receipt of a request from a user located external to said server for a signed authentication certificate from said target machine, a public encryption cryptographic key received from said user to access said stored private-public encryption cryptographic key pair stored in said server to validate said request; and
   transmitting, in response to validation of said user provided public encryption cryptographic key, said stored signed authentication certificate to said user.

16. The method of claim 15 further comprising:
   checking, in response to receipt of a request from a user for a signed authentication certificate, the expiration date of the signed authentication certificate stored in said server to ascertain its validity; and
   generating a warning about pending or actual expiration of the signed authentication certificate if said expiration date is within a predetermined time range of expiration or has expired.

17. One or more computer-readable memories containing a computer program that is executable by a processor to perform the method recited in claim 9.

18. An authentication certificate management apparatus comprising:
   means, responsive to a user initiating a request for issuance of an authentication certificate, for automatically generating an authentication certificate request, which has a predetermined format and content including a plurality of fields of data, wherein the means for automatically generating an authentication certificate request includes:
      means for prompting said user to input at least one set of data for entry into at least one of said plurality of fields of data,
      means for verifying form and format of said user input data,
      means for automatically generating at least one set of data, wherein the at least one set of data includes a private-public encryption cryptographic key pair,
      means for processing said automatically generated at least one set of data and said user input data into said predetermined authentication certificate request format and content;
   means for transmitting said generated authentication certificate request to an authentication certificate granting authority;
   means, responsive to receipt of a signed authentication certificate from said authentication certifying granting authority, for installing said signed authentication certificate on a server for at least one target machine, wherein the means for installing includes:
      means, responsive to a user inputting a password, for unlocking said private-public encryption cryptographic key pair,
      means for matching said signed authentication certificate with said private-public encryption cryptographic key pair and said stored authentication certificate request,
      means, responsive to a validated signed authentication certificate, for storing said validated signed authentication certificate in said server for said at least one target machine.

19. The apparatus of claim 18 wherein said means for processing further comprises:
   means for storing said generated private-public encryption cryptographic key pair in said server.

20. The apparatus of claim 18 wherein said means for processing further comprises:
   means for storing said generated authentication certificate request in said server.

21. A method of providing network services to at least one application process on at least one target machine, the method comprising:
   automatically generating, in response to a user initiating a request for issuance of an authentication certificate, an authentication certificate request, which has a predetermined format and content including a plurality of fields of data, wherein the step of automatically generating an authentication certificate request includes:
      prompting said user to input at least one set of data for entry into at least one of said plurality of fields of data,
      verifying form and format of said user input data,
      automatically generating at least one set of data, wherein the at least one set of data includes a private-public encryption cryptographic key pair,
      processing said automatically generated at least one set of data and said user input data into said predetermined authentication certificate request format and content;
   transmitting said generated authentication certificate request to an authentication certificate granting authority;
   installing, in response to receipt of a signed authentication certificate from said authentication certifying granting authority, said signed authentication certificate on a server for at least one target machine, wherein the step of installing includes:
      unlocking, in response to a user inputting a password, said private-public encryption cryptographic key pair, matching said signed authentication certificate with said private-public encryption cryptographic key pair and said stored authentication certificate request, storing, in response to a validated signed authentication certificate, said validated signed authentication certificate in said server for said at least one target machine.

22. The method of claim 21 wherein said step of processing further comprises:

storing said generated private-public encryption cryptographic key pair in said server.

23. The method of claim 21 wherein said step of processing further comprises:

storing said generated authentication certificate request in said server.

24. One or more computer-readable memories containing a computer program that is executable by a processor to perform the method recited in claim 20.

25. A method of generating an authentication certificate request, the method comprising:

prompting a user to input at least one set of data for entry into at least one field of data in the authentication certificate request;

verifying form and format of said user input data;

generating at least one set of data for entry into at least one field of data in the authentication certificate request;

processing said automatically generated data and said user input data to create an authentication certificate request, wherein the authentication certificate request complies with a predetermined authentication certificate request format and content, and wherein the authentication certificate request is capable of being transmitted to an authentication certificate granting authority.

26. The method of claim 25 wherein the step of automatically generating at least one set of data comprises generating a private-public encryption cryptographic key pair.

27. The method of claim 26 wherein the step of processing comprises:

incorporating a public encryption cryptographic key of said private-public encryption cryptographic key pair into said authentication certificate request; and storing said generated private-public encryption cryptographic key pair in a server.

28. The method of claim 27 further comprising:

installing a signed authentication certificate on said server for at least one target machine.

29. One or more computer-readable memories containing a computer program that is executable by a processor to perform the method recited in claim 25.

30. One or more computer-readable media having stored thereon a computer program comprising the following steps:

prompting a user to input at least one set of data for entry into at least on field of data in an authentication certificate request;

verifying form and format of said user input data;

automatically generating at least one set of data for entry into at least one field of data in the authentication certificate request;

processing said user input data and said automatically generated data to create an authentication certificate request, wherein the authentication certificate request complies with a predetermined authentication certificate request format and content, and wherein the authentication certificate request is capable of being transmitted to an authentication certificate granting authority.

31. One or more computer-readable media as recited in claim 30 wherein the step of automatically generating at least one set of data comprises generating a private-public encryption cryptographic key pair.

32. One or more computer-readable media as recited in claim 30 wherein the step of processing comprises incorporating a public encryption cryptographic key of said private-public encryption cryptographic key pair into said authentication certificate request.

33. An authentication certificate management apparatus comprising:

an interface module to prompt a user to input at least one set of data for entry into at least one of a plurality of data fields;

a verification module to verify form and format of said data input by the user;

a data generation module to automatically generate at least one set of data;

a processor to process the data input by the user and the automatically generated data into an authentication certificate request having a predetermined format and content; and a transmitter to transmit the authentication certificate request to an authentication certificate granting authority.

34. The apparatus of claim 33 wherein the data generation module is further to generate a private-public encryption cryptographic key pair.

35. The apparatus of claim 33 wherein the processor is further to store the authentication certificate request.

36. The apparatus of claim 33 further including an installation module to install a signed authentication certificate on a server for at least one target machine in response to receiving a signed authentication certificate from an authentication certificate granting authority.

37. The apparatus of claim 36 further including a matching module to match the signed authentication certificate with a private-public encryption cryptographic key pair and a stored authentication certificate request to validate the signed authentication certificate.

38. The apparatus of claim 33 further including an expiration checking module to check the expiration date of a signed authentication certificate stored in a server, thereby determining the validity of the signed authentication certificate.

* * * * *

UNITED STATES PATENT AND TRADEMARK OFFICE
CERTIFICATE OF CORRECTION

PATENT NO.   : 6,134,658
DATED        : October 17, 2000
INVENTOR(S)  : Boyd Multerer et al.

It is certified that error appears in the above-identified patent and that said Letters Patent is hereby corrected as shown below:

Column 1,
Lines 33 and 43, change "requester" to -- requestor --.
Line 34, change "requester" after "requestor".

Column 3,
Line 56, change "requester" to -- requestor --.

Column 6,
Line 53, change "requester" to -- requestor --.

Column 7,
Line 10, change "requester" to -- requestor --.

Column 11,
Line 49, change "};" to -- ): --.

Column 15,
Line 16, change "}" to -- }; --.

Column 16,
Line 35, change "keys" to -- key --.

Column 19,
Line 26, add -- automatically -- before "generating".

Signed and Sealed this

Eighteenth Day of December, 2001

Attest:

*Attesting Officer*

JAMES E. ROGAN
*Director of the United States Patent and Trademark Office*